(12) United States Patent
Bergfelder et al.

(10) Patent No.: US 12,234,847 B2
(45) Date of Patent: Feb. 25, 2025

(54) UNDERCUT ANCHOR, SETTING TOOL FOR SETTING AN UNDERCUT ANCHOR AND SETTING METHOD FOR AN UNDERCUT ANCHOR

(71) Applicant: Keil Befestigungstechnik GmbH, Engelskirchen (DE)

(72) Inventors: Jürgen Bergfelder, Engelskirchen (DE); Alexander Wollmann, Reichshof (DE)

(73) Assignee: Keil Befestigungstechnik GmbH, Engelskirchen (DE)

( * ) Notice: Subject to any disclaimer, the term of this patent is extended or adjusted under 35 U.S.C. 154(b) by 0 days.

(21) Appl. No.: 18/286,119

(22) PCT Filed: Apr. 13, 2022

(86) PCT No.: PCT/EP2022/059913
§ 371 (c)(1),
(2) Date: Oct. 7, 2023

(87) PCT Pub. No.: WO2022/219062
PCT Pub. Date: Oct. 20, 2022

(65) Prior Publication Data
US 2024/0191739 A1    Jun. 13, 2024

(30) Foreign Application Priority Data
Apr. 13, 2021   (DE) ............... 10 2021 109 198.5

(51) Int. Cl.
*F16B 13/04*      (2006.01)
*F16B 13/00*      (2006.01)

(52) U.S. Cl.
CPC ...... *F16B 13/004* (2013.01); *F16B 2013/007* (2013.01)

(58) Field of Classification Search
CPC .................. F16B 13/004; F16B 2013/007
(Continued)

(56) References Cited

U.S. PATENT DOCUMENTS 1,470,858 A * 10/1923 Maxwell ............... E05B 9/084
70/DIG. 7
2,003,100 A    5/1935  Aprin
(Continued)

FOREIGN PATENT DOCUMENTS

DE     4400895 A1    7/1995
DE   196 22 544 A1  12/1997
(Continued)

OTHER PUBLICATIONS

European Patent Office, International Search Report for PCT App. No. PCT/EP2022/059913, Aug. 3, 2023, pp. 1-5.
(Continued)

*Primary Examiner* — Gary W Estremsky
(74) *Attorney, Agent, or Firm* — CAHN & SAMUELS, LLP

(57) ABSTRACT

An undercut anchor 2; 30, which facilitates the formation of a corresponding undercut in a blind hole for receiving the undercut anchor 2; 30, is formed to independently cut or form this undercut by rotating and spreading the undercut anchor 2; 30. Furthermore, a setting tool for forming this undercut at the bottom of the blind hole in the joining partner is proposed. Finally, a method of forming an undercut at the bottom of a blind hole using the setting tool is disclosed.

2 Claims, 9 Drawing Sheets

(58) Field of Classification Search
USPC .......................................................... 411/30
See application file for complete search history.

(56) References Cited

U.S. PATENT DOCUMENTS

| | | | | | |
|---|---|---|---|---|---|
| 2,379,786 | A | * | 7/1945 | Bugg | F16B 39/284 |
| | | | | | 411/80.6 |
| 2,448,351 | A | * | 8/1948 | Brush | F16B 37/043 |
| | | | | | 411/80.5 |
| 2,561,433 | A | * | 7/1951 | Uhle | F16B 37/122 |
| | | | | | 411/80.6 |
| 2,649,884 | A | * | 8/1953 | Westover | F16B 37/043 |
| | | | | | 411/173 |
| 3,122,049 | A | * | 2/1964 | Dieterich | F16B 13/0858 |
| | | | | | 411/54 |
| 3,200,692 | A | * | 8/1965 | Catlin | F16B 13/0858 |
| | | | | | 411/30 |
| 4,449,877 | A | * | 5/1984 | Kessler | B25B 27/0014 |
| | | | | | 411/72 |
| 5,135,341 | A | * | 8/1992 | Leyder | B60R 11/02 |
| | | | | | 411/182 |
| 5,816,760 | A | * | 10/1998 | Mattner | F16B 13/004 |
| | | | | | 411/52 |
| 9,844,866 | B2 | | 12/2017 | Langdon, Jr. | |
| 2015/0258672 | A1 | | 9/2015 | Langdon, Jr. | |
| 2021/0087932 | A1 | | 3/2021 | Cousineau | |

FOREIGN PATENT DOCUMENTS

| | | |
|---|---|---|
| DE | 10 2010 025 975 A1 | 1/2012 |
| DE | 20 2012 001 547 U1 | 5/2012 |
| DE | 10 2012 104 050 A1 | 11/2013 |
| DE | 20 2012 001 542 U1 | 4/2020 |
| WO | 2012/001110 A1 | 1/2012 |
| WO | 2013/120746 A1 | 8/2013 |

OTHER PUBLICATIONS

European Patent Office, Written Opinion for PCT App. No. PCT/EP2022/059913, Aug. 3, 2023, pp. 1-8.
European Patent Office, Preliminary Report on Patentability for PCT App. No. PCT/EP2022/059913, Jun. 30, 2023, pp. 1-28.
European Patent Office, Espacenet, English abstract for DE4400895A1, printed on Oct. 6, 2023.

* cited by examiner

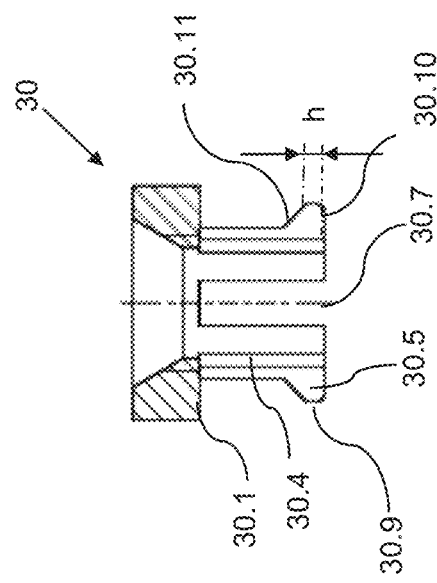
Fig. 14
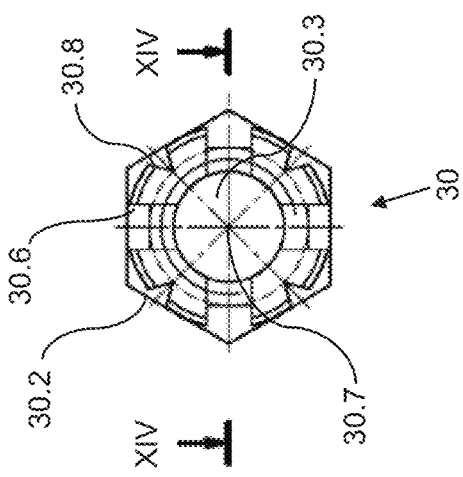
Fig. 12
Fig. 13

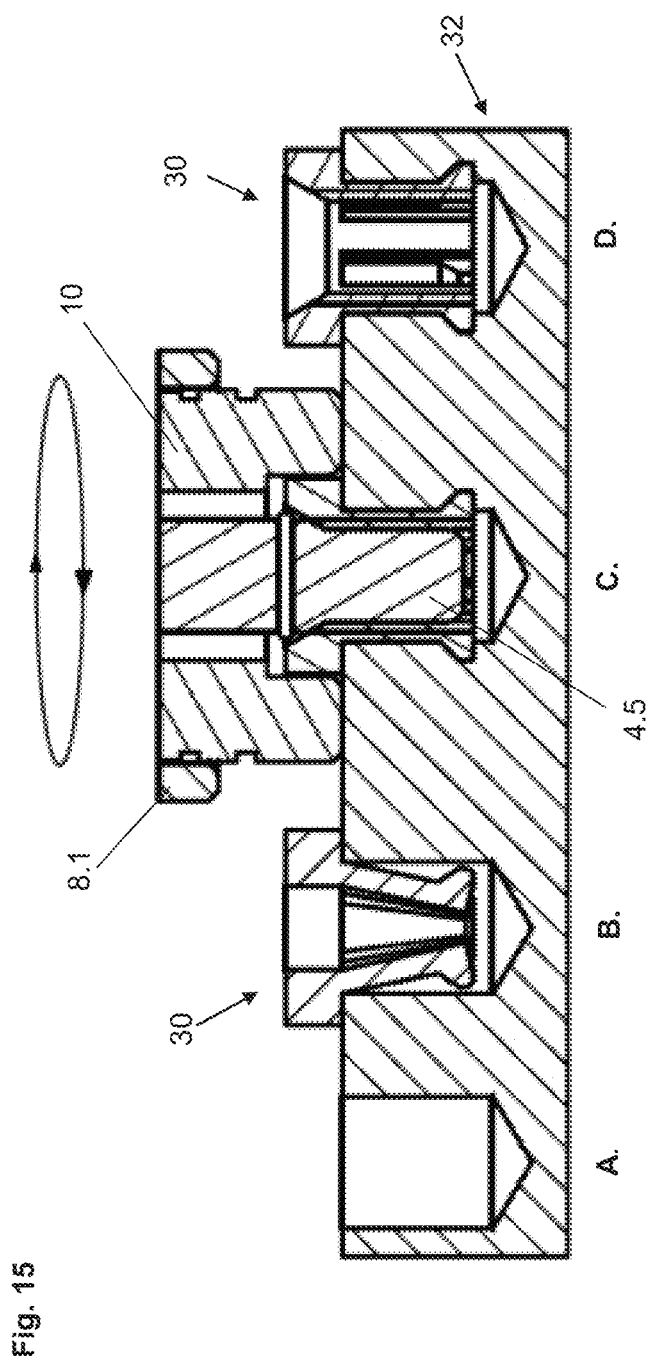

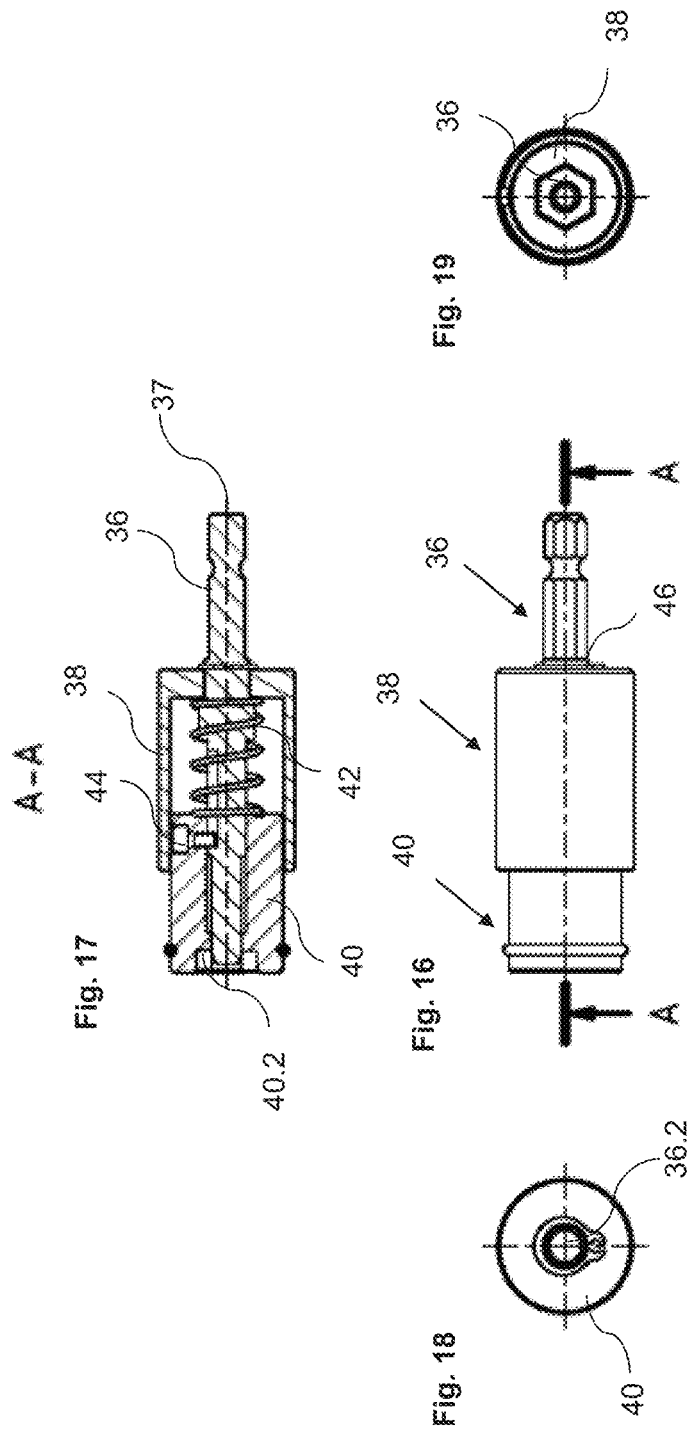

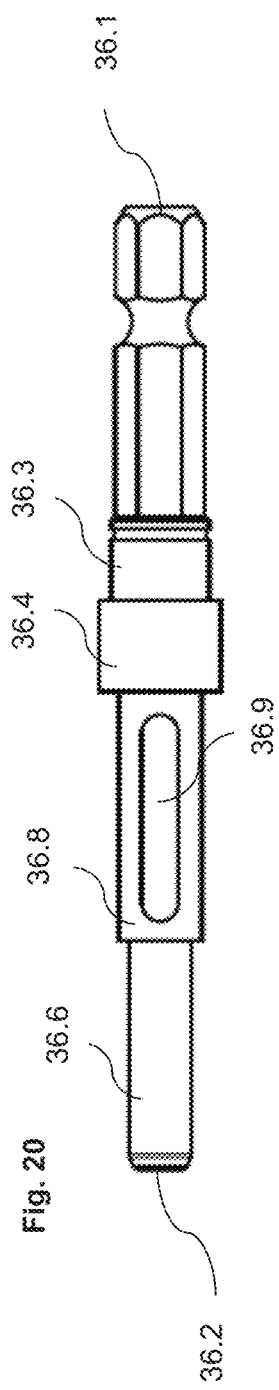

UNDERCUT ANCHOR, SETTING TOOL FOR SETTING AN UNDERCUT ANCHOR AND SETTING METHOD FOR AN UNDERCUT ANCHOR

The invention relates to an undercut anchor which can be inserted into a bore of a joining partner, in particular a material slab, e.g. a concrete slab or a stone slab or the like, to a setting tool for fastening or setting such an undercut anchor in a blind hole of the joining partner, and to a method for fastening an undercut anchor in a blind hole of a joining partner receiving the undercut anchor.

STATE OF THE ART

A generic undercut anchor comprises a substantially hollow cylindrical body extending along and about a longitudinal axis of the anchor and extending from an outer end disposed in the installed position on a surface of the mating partner to an inner end within a blind hole within the mating partner. A radially outwardly projecting seating shoulder or seating collar is formed at the outer end, which has a through opening extending along the longitudinal axis of the anchor with an internal thread. With this radially projecting seating shoulder, the undercut anchor can be placed around a blind hole in the mating partner on an outer surface of the mating partner. Furthermore, the seating shoulder comprises key surfaces on an outer circumferential surface thereof for rotationally fixed connection or for rotationally fixed attachment of a tool for arranging the undercut anchor in the blind hole of the joining partner. Extending from the seating shoulder parallel to the longitudinal axis of the anchor or extending along the longitudinal axis of the anchor, a plurality of arm-shaped and spreadable spreading arms are arranged on the seating shoulder extending outwardly offset from the longitudinal axis of the anchor. Finally, a radially outwardly projecting undercut shoulder is formed at the inner end of each of these expansion arms. This undercut shoulder at the inner end of the undercut anchor engages in the installed position in an undercut formed correspondingly at the bottom of the blind hole when a screw is screwed into the internal thread of the through hole of the undercut anchor, thereby spreading the spreader arms with the undercut shoulders formed on them outwardly from the longitudinal axis of the anchor and thus pressing the undercut shoulders into this undercut of the joining partner in order to realize a captive connection between the undercut anchor and the joining partner.

Such an undercut anchor is also called a "set anchor" or simply an "anchor". A fastening means, often referred to as an "agraffe", can then be arranged on the contact surface of the joining partner on which the seating shoulder rests. Such an agraffe is a shaped piece, in particular a metal piece with a through-opening that has been given a certain bend-resistant shape, which can be placed on the seating shoulder and can then be screwed to the undercut anchor by means of a screw, so that the screw captively fixes the agraffe to the joining partner.

A generic mounting or setting method is known from DE 20 2020 100542 U1.

DISADVANTAGES AT THE STATE OF THE ART

However, the production of the undercut at the bottom of the blind hole is relatively time-consuming and, because of the safety relevance of the fastening, can often only be carried out by trained personnel with special tools. Drilling with the undercut is carried out in basically two procedural steps. First, a cylindrical blind hole is created in the joining partner with a cylindrical drill, which has the required penetration depth. Then, in a second process step, the undercut is produced at the bottom of this cylindrical blind hole with an eccentrically deflectable undercut facade drill that can be angled radially on one side. This undercut facade drill has a hook-shaped nose projecting on one side at the lower end of a drill rotating about an axis of rotation. If the undercut facade drill is now set in rotation and this nose of the drill is angled laterally away from the axis of rotation, this unilaterally projecting nose cuts an undercut into the lateral lateral surface of the cylindrical blind hole during rotation and thus produces the required undercut at the bottom of the blind hole, i.e. a section projecting radially beyond the other outer surface of the hole, into which the undercut shoulder of the undercut anchor can engage positively in the installation position.

First of all, this two-stage process with the production of the basic bore and the subsequent basic drilling and provision of the undercut is relatively costly. An undercut facade drill is relatively expensive as a special tool, which should also only be operated by trained personnel. Sometimes, improper handling results in destruction of the joining partner due to material fatigue or excessive penetration. In the case of highly abrasive, harder materials of the joining partners, the special drills and the tools wear out quickly, so that the drilled holes have to be checked, which is of safety significance, especially with larger loads, e.g. to prevent a facade panel from falling from greater heights.

Such an undercut anchor is known, for example, from utility model DE 20 2012 001 547 U1 of the applicant's predecessor company.

U.S. Pat. No. 2,003,100 also discloses an undercut anchor and U.S. Pat. No. 2,561,433 discloses a sleeve without a seating shoulder that is inserted into a blind hole and then expanded.

DE 196 22 544 discloses an undercut anchor with an expansion sleeve which is inserted into a blind hole. By screwing in an anchor rod by means of a pressure nut, cutting edges at the lower end of the expansion sleeve are bent radially outward.

DE 10 2010 025 975 A1 relates to a metal dowel 1 comprising radially projecting crenellations 2 which wedge into a rear circumferential edge 23. The metal dowel 1 has an outer circumferential section 3 with recesses at the outer end, so that upon rotation notches are formed which create an undercut in the substrate material (stone).

DE 10 2012 104 050 A1 discloses an expansion anchor 1 and a setting tool for setting this expansion anchor.

Finally, DE 44 00 895 discloses a screwable tool with locking blades that is inserted into a drilled hole with an existing undercut.

Another known prior art is the so-called rivet anchor, which can be inserted into a regular blind hole on the joining partner, i.e. which does not require an undercut at the bottom of the blind hole. Such rivet anchors comprise a hollow cylindrical rivet body arranged around a mandrel in a longitudinal direction of the rivet, which rests with a lower end on a tension plate of the mandrel and is inserted into the blind hole with this first. The tie rod is then tightened and the rivet anchor is held in the blind hole, causing the rivet anchor to spread in the blind hole. Since the tension mandrel has the tension plate at the lower end, the material of the tension anchor is compressed and circumferentially pressed against the inner lateral surface of the surrounding blind hole. Thus, only a frictional connection is realized between the rivet anchor and the blind hole, and in contrast to the undercut anchor, not a particularly reliable and stable form fit. For this reason, a rivet anchor is not suitable for fastening joining partners at greater heights. Furthermore, a rivet anchor has the disadvantage that the blind hole must be designed deeper than with a comparable undercut anchor and, in this respect, the remaining thickness of the joining partner, i.e. of the material from the bottom of the blind hole to the opposite surface, is sometimes too low, which can lead to fractures at the fastening interfaces.

Task

Based on the aforementioned prior art and the associated disadvantages, the invention is thus based on the task of at least partially avoiding the aforementioned disadvantages and, in particular, providing an undercut anchor and a method for fastening an undercut anchor that at least partially avoids the aforementioned disadvantages and, in particular, realizes a simple and reliable fastening of the undercut anchor in the joining partner.

Invention

According to the invention, this task is already solved by the independent claims. Preferred but not mandatory features are laid out in the subclaims.

Disclosed are two essential components, namely, firstly, undercut anchors designed to independently create, i.e. cut, the undercut in the joining partner at the bottom of the blind hole by rotation of the same.

Furthermore, a special setting tool is proposed which is designed to rotate such an undercut anchor inserted into the blind hole and simultaneously spread it open, i.e. to spread the spreading arms with the undercut shoulders at the inner end outwards from the longitudinal axis of the anchor, which thus acts as the axis of rotation.

The design of the undercut anchor according to the invention thus makes it possible for the second step required in the prior art to produce the undercut in the joining partner to be carried out by the undercut anchor itself, and the second step, namely cutting the undercut with the undercut facade drill, to be completely omitted.

In the process according to the invention, only a blind hole of the appropriate depth needs to be drilled in the joining partner. The front end of the undercut anchor can then be inserted into this blind hole. By rotating and spreading the undercut anchor, the required undercut at the bottom of the blind hole is created by the undercut anchor itself. When the undercut anchor is rotated around the longitudinal axis of the anchor, the undercut is created at the bottom, i.e. lower end of the blind hole or just above it. Then, after removing the corresponding setting tool, the retaining element, in particular an agraffe, can be fastened to the anchor by placing the retaining element on the anchor and then captively fastening it to the joining partner with a screw. The undercut is thus precisely adapted to the respective undercut anchor, which ensures a particularly stable and secure form-fit connection in which errors are excluded due to the process.

In this description, the terms distal and proximal refer to the drive tool connected to the drive end, such as a cordless screwdriver. Proximal is therefore oriented towards the cordless screwdriver, whereas distal is oriented away from the cordless screwdriver.

The undercut anchor can basically be used for very many materials on joining partners. For softer materials, the normal undercut anchor with the lateral edges of the individual undercut shoulders at the inner end of the expansion arms, which first engage in the blind hole to create the undercut in the receiving material of the joining partner, is sufficient. This is possible, for example, with fiber cement, laminated plastic (HPL), plastic, fiber concrete, solid surface material or UHPC.

Such an undercut anchor is preferably manufactured from a solid material in various tensioning production steps, in particular a solid steel material, especially preferably a hexagonal, a square or a round solid material.

The preferably four expansion arms are—in the view from below—arranged rotationally symmetrically around the longitudinal axis of the anchor on a circle surrounding it and extend in the longitudinal direction of the undercut anchor from the underside of the seating shoulder towards the inner end. A gap or spacing is formed in each case between two adjacent spreader arms, which gap or spacing is preferably produced in the cylindrical shell surface by means of milling, and extends along the entire length of the spreader arms, thus separating them from one another, so that they can be individually spread outwards for optimum adaptation to the configuration of the blind hole. Preferably, the expansion anchor comprises four expansion arms formed on a common circle on the underside of the seat heel, the expansion arms being uniformly spaced from one another about the longitudinal axis of the anchor and extending from the underside of the seat heel to the inner end.

At the inner end of each spreader arm there is an undercut shoulder, preferably tapering radially outwards, which projects radially outwards again by approximately the radial width of the spreader arms.

This undercut shoulder, which projects radially outwards and is essentially pointed, is preferably formed by two legs which enclose an acute angle between them, namely an inner leg extending horizontally in the assembly position, i.e. when inserted in the blind hole, at the inner end of the spreader arms and an outer leg facing the outer end or the seating shoulder, which encloses an angle of approx. 45 degrees radially outwards with the inner leg. To achieve the required stability, the height of the undercut shoulder at the outer end is 0.5 to 1.5 mm, preferably 0.8 to 1.3 mm, and is thus significantly more stable than known undercut shoulders to facilitate cutting of the undercut.

Preferably, the undercut anchor has a particularly stable undercut shoulder at the lower and radially outwardly directed inner end of the expansion arms, which is higher than in the prior art. This is particularly so because knurling can additionally be formed at the radial outer ends or outer circumferential surfaces of the undercut shoulder in order to improve and increase the material removal for forming the undercut in the blind hole.

To further improve the cutting action for introducing the undercut according to the method according to the invention, the radial outer edge of the undercut shoulder can be particularly high, especially two to four times as high as in the prior art. Preferably, the height of the undercut shoulder at the radially outer end or circumferential edge is between 0.2 to 1 mm, preferably 0.4 to 0.8 mm, particularly preferably especially 0.5 mm. In addition, to improve the cutting effect, the cutting edges can be introduced in the circumferential edge and/or the circumferential edge can be provided with knurling.

In the as-delivered condition, the inner ends of the spreader arms are preferably compressed so that the outer peripheral surface of the undercut shoulder is flush with or in line with the outer radius or attachment points of the spreader arms below the attachment collar.

The cutting edges for cutting the undercut can be formed on the lateral flanks, i.e. adjacent to a gap between two spreader arms.

Improved cutting performance can be achieved if at least one, preferably several, cutting notches are additionally provided on the undercut shoulders to form further cutting edges.

Preferably, these are formed as cutting notches or cutting recesses formed in the undercut shoulders. Preferably, these cutting notches are formed rotationally symmetrically around the longitudinal axis of the armature, which serves as the axis of rotation, in order to produce a smooth cutting action and less imbalance. Particularly preferably, the cutting notches are formed approximately centrally or exactly centrally in a respective undercut shoulder and extend over the entire width of the undercut shoulder, i.e. up to the respective spreading arm. Preferably, the notches are formed in the geometry of an isosceles or equilateral triangle.

It has proved particularly preferable to have the cutting notches in the center of each undercut shoulder, so that the cutting notches are diametrically opposed on connecting lines through the central axis of rotation.

It is also possible that the undercut shoulder or shoulders of the spreader arms have a knurl radially on the outside, e.g. a longitudinal or cross knurl, in order to realize the necessary material removal. In this case, it may be expedient for the undercut shoulders to be more stable, i.e. extending along the longitudinal axis of the armature, and to have a higher design at the radial outer edge than in the first embodiment, in particular with a height of between 0.5 and 1.5 mm, preferably 0.8 to 1.3 mm in the region between the inner leg and the outer leg of the undercut shoulders.

Of course, it is also possible to combine the knurling with other cutting edges or cutting recesses.

For setting, i.e. arranging the undercut anchor in the blind hole of the joining partner, a setting tool was also developed during the development of the invention, for which protection is claimed separately from the undercut anchor.

The setting tool proposed in accordance with the invention is designed to be connected in a rotationally fixed manner to an end of a composite anchor which is on the outside in the installation position, in particular in order to receive the outer end in a rotationally fixed manner within itself, in order to rotate the undercut anchor about the longitudinal axis of the anchor and to expand the expansion arms of the composite anchor outwards, i.e. to bend them outwards in relation to the longitudinal axis of the anchor, for which purpose the expansion arms can have a predetermined bending point at the connection point to the seating shoulder or seating collar.

The invention thus also relates to a setting tool for setting an undercut anchor in a blind hole of a joining partner, in particular of plate-shaped design, with a drive end extending about an axis of rotation from a proximal end designed as a drive end to a distal end designed as an active end. The drive end is thus designed for rotationally fixed connection to a drive device, e.g. a drill, a cordless screwdriver or the like. The drive end thus fulfills the function of transmitting a torque to the setting tool. Particularly preferably, the drive end is designed as a hexagon and can thus be inserted into a normal bit holder of a drilling machine or another rotary tool or drive. The active end is also designed to transmit this torque to an undercut anchor, for which purpose it preferably has a receiving opening for receiving a seating shoulder of the undercut anchor.

A socket is formed at the working end with a receiving opening and wrench flats formed therein for the rotationally fixed reception of a seating shoulder of an undercut anchor, which can thus be placed on the seating shoulder of the undercut anchor to realize a form-fit connection. This socket is non-rotatably connected to the main shaft and at the same time longitudinally displaceable along the main shaft. At the distal active end, the main shaft can be designed as a plug-in expanding mandrel with an expanding end at the distal front end. A compression spring acts on a proximal end of the plug-in mandrel by displacing the plug-in mandrel on the main shaft towards the proximal drive end, the expansion end of the main shaft is thus inserted between the expansion arms of the relevant anchor, thereby pushing these expansion arms radially outwards away from the longitudinal axis of the anchor, so that the undercut shoulders on the expansion arms rest against the bottom end of the blind hole. Now, due to the non-rotational connection of the plug nut to the main shaft, the necessary torque can be applied by the setting tool to thus cut the undercut at the bottom of the blind hole of the blind hole.

The preferred embodiment provides for the design of the drive end as a bit that can be detachably connected to a universal bit holder of the drive tool, for example, in a rotationally fixed manner. Preferably, the universal bit holder has a ball lock which can be released by pulling a ring and with which the setting tool can be inserted into the universal bit holder. In this embodiment, the compression spring is thus arranged between the front end of the universal bit holder and the proximal rear end of the nut and thus presses the nut along the longitudinal axis of the setting tool towards the distal effective end.

The rotationally fixed connection between the main shaft and the nut can be made in various ways. The formation of complementary, positively interlocking joining surfaces between the joining partners has proved to be preferred, with a complementary square or hexagonal formation being particularly preferred. However, it is also possible to arrange a key between the main shaft and the nut.

On a preferred embodiment, the main shaft of the setting tool may have a sleeve stop distal from the drive end that has an outer diameter that is wider than the outer diameter of the drive end and which thus functions as a distal stop for the contact of a sleeve.

Distal from this sleeve stop is the non-rotating attachment of a nut or socket to the main shaft.

Preferably, a nut section is formed on the main shaft for this purpose, i.e. an area where the nut is connected to the main shaft in a rotationally fixed and longitudinally displaceable manner. Preferably, this nut section has a reduced nut section diameter compared to the sleeve stop.

A preferred possibility for realizing the rotationally fixed but relatively movable connection between the socket and the main shaft consists of a screw screwed into the outer lateral surface of the socket, which engages in an elongated groove formed in one side of the main shaft. This elongated groove thus simultaneously defines the front and rear stop position of the relative movement of the socket in the sleeve receiving it.

The distal axial fixing of the nut on the main shaft or the formation of a stop on the main shaft for the nut to rest against is preferably achieved by means of a snap ring, which is located in particular in the area immediately in front of the expansion end at the distal front end of the main shaft.

Distal to this sleeve stop, an expanding section can be formed on the main shaft, which can again have a reduced outer diameter compared to an outer diameter of the sleeve stop.

This expansion section can have the expansion end at its distal end, so it is designed to be inserted into the threaded opening of the undercut anchor and thereby expand the expandable connection sections radially outward with the undercut shoulders formed on them.

In the preferred embodiment, the expanding end at the distal end of the main shaft is cylindrical and can preferably be hardened. Sometimes this expanding end can also have a slightly reduced outer diameter compared to the remaining diameter of the main shaft.

A sleeve is placed proximally on the sleeve stop with a central through opening abutting the main shaft and is further fixed proximally, which can be done by a nut or preferably by a snap ring. In this embodiment, the compression spring is also inserted between the sleeve and the socket, so that this embodiment of the insertion tool can be supplied as a completely separate part with the spring installed.

In addition to the undercut anchor and the setting tool separate from these objects, the invention further relates to a fastening method or a setting method of an undercut anchor in a blind hole of a joining partner, in particular a concrete slab or composite slab, comprising the method steps:

Drilling a percussion blind hole in the joining partner extending from a blind hole upper end on an outer surface of the joining partner to a blind hole lower end in the joining partner, Formation of an undercut in the joining partner at the bottom of the blind hole or at least in the area thereof, wherein the undercut is created by rotating and spreading the undercut anchor in the blind hole.

Preferably, the undercut anchor is set using the setting tool described above.

Typically, such undercut anchors are used in practical applications with the following dimensions/installation situations:

| | |
|---|---|
| Plate thickness of the joining partner receiving the anchor | 6-18 mm |
| Anchor setting depth | 4-15 mm |
| Clamp thickness | 0-6 mm |
| Diameter borehole | 7 mm |
| Diameter undercut | 9 mm |

Depending on the application, other geometric designs are of course possible.

Embodiments include forming the socket as a long socket, such as is used for fastening spark plugs, to realize a longer screw-in length.

In the following detailed description of figures, reference is made to the accompanying drawings which form part of this description of the invention and in which specific embodiments by which the invention may be practiced are shown for illustrative purposes. In this regard, directional terminology, such as "top," "bottom," "front," "rear," "front," "rear," etc., is used in reference to the orientations of the figure(s) described. Because components of embodiments may be positioned in a number of different orientations, the directional terminology is for illustrative purposes and is not limiting in any way. It is understood that other embodiments may be used and structural or logical changes may be made without departing from the scope of protection of the present invention. The following detailed description is not to be construed in a limiting sense. In the context of this description, the terms "connected", "connected" as well as "integrated" are used to describe both a direct and an indirect connection, a direct or indirect connection as well as a direct or indirect integration. Unless otherwise specified, the indefinite article and definite article refer not only to a single component, but are to be understood as "at least one". The terminology includes the previously mentioned words, variations thereof, and similar meanings. Further, it should be understood that the terms "about," "substantially," and similar terms in connection with the dimensions and a property of a component of the invention do not describe the described dimension and property as a strict limit or parameter and do not exclude minor variations thereof which are functionally similar. At a minimum, descriptive portions with numerical parameters also include variations of those parameters in accordance with prior art mathematical and manufacturing principles, e.g., rounding, deviations and other systematic errors, manufacturing tolerances, etc. In the figures, identical or similar elements are given identical reference signs where appropriate. Reference mark lines are lines connecting the reference mark to the part in question. An arrow, on the other hand, that does not touch a part refers to an entire unit to which it is directed. Identical reference numerals in the figures refer to identical components or features. Incidentally, the representations in the figures are not necessarily to scale. Certain areas may be shown exaggeratedly large to illustrate details. In addition, the drawings may be strikingly simplified and do not include every detail that may be present in the practical embodiment.

All features of the respective embodiment examples are disclosed here independently and independently of other features of the respective embodiment example. Likewise, the above-mentioned features and those described in further detail can each be used individually or in any combination of several in accordance with the invention. The embodiments shown and described are not to be understood as a conclusive list, but rather have an exemplary character for the description of the invention. Showing:

FIG. 1 a highly magnified, isometric plan view of a first embodiment of an undercut anchor according to the invention;

FIG. 2a bottom view of the undercut anchor according to FIG. 1;

FIG. 3 the undercut anchor according to FIG. 2 rotated by 60°;

FIG. 4 a cross-section through the undercut anchor according to line IV-IV in FIG. 2;

FIG. 5 a cross-section through the undercut anchor along the line V-V according to FIG. 3;

FIG. 6 a top view of a first embodiment of the setting tool;

FIG. 7 a longitudinal section of the setting tool according to FIG. 6 along line VII-VII;

FIG. 8 a front view of the setting tool according to FIG. 6;

FIG. 9 a rear view of the setting tool according to FIG. 6;

FIG. 10 a top view of the main shaft of the setting tool according to FIG. 7;

FIG. 11 an alternative embodiment of a setting tool in the operating state when fastening an undercut anchor in a joining partner;

FIG. 12 an isometric top view of a second embodiment of an undercut anchor with knurling according to the invention;

FIG. 13 a view of the undercut anchor according to FIG. 12 from below;

FIG. 14 a cross-section of the undercut anchor according to FIG. 13 along line XIV-XIV;

FIG. 15 the setting procedure of an undercut anchor with the setting tool in a joining partner on the basis of four substeps (A-D), each at the end of a substep;

FIG. 16 a top view of a third embodiment of the setting tool;

FIG. 17 a longitudinal section of the self-tool according to FIG. 16 along line A-A;

FIG. 18 a front view of the setting tool according to FIG. 16;

FIG. 19 a rear view of the setting tool according to FIG. 16; and

FIG. 20 is an enlarged top view of the main shaft of the setting tool according to FIG. 16.

Figure 1:
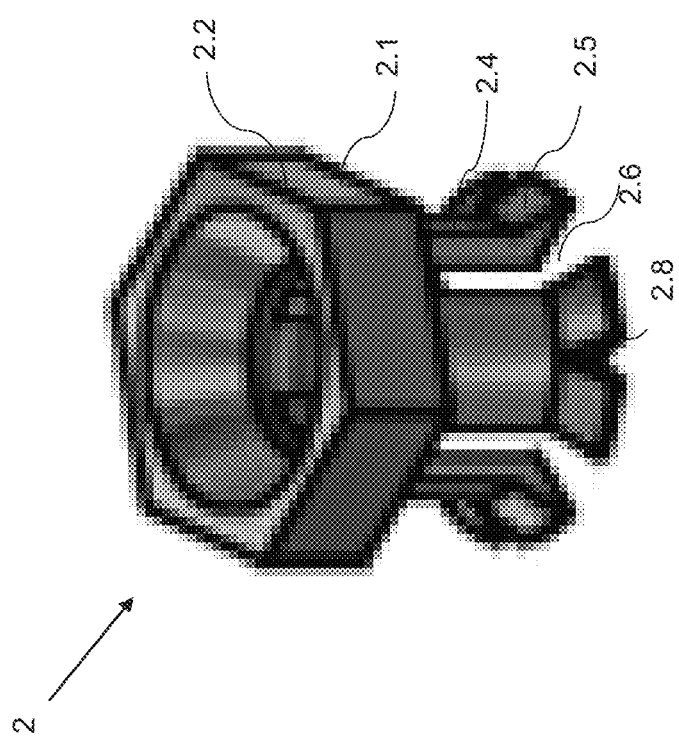
FIG. 1 shows an isometric plan view of a first embodiment of the undercut anchor 2 according to the invention, which comprises a substantially hollow cylindrical base body extending from a joining partner having an outer end seated in the installed position on a surface around a blind hole and extending to an inner end fixed in the joining partner around an anchor longitudinal axis 2.7.
Figure 2:
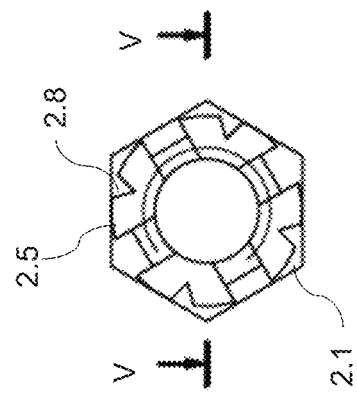
Figure 3:
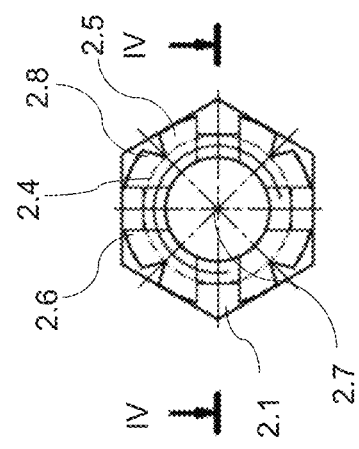
Figure 4:
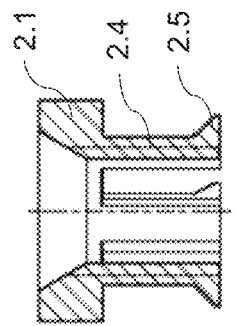
Figure 5:
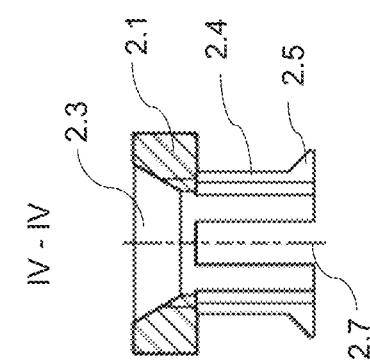
Figure 9:
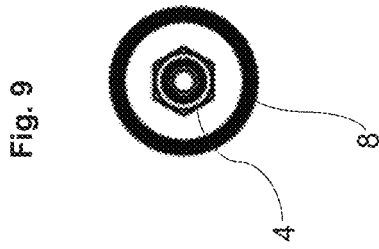

The outer end has a seating shoulder 2.1 projecting radially outward from the central longitudinal axis, here closed in an annular shape, which is provided with a hexagonal wrench flat 2.2 on its outer circumferential surface.

A through opening 2.3 is formed centrally in this base body and the outer end, extending along the longitudinal axis of the armature 2.7 and provided with an internal thread.

The seating shoulder 2.1 is designed as a circumferential collar at the outer end with wrench flats 2.2 on the outside. The through opening 2.3 has an internal thread into which a screw or an insertion pin with a complementary external thread can be screwed. At the end of the seat shoulder 2.1 facing the inner end, four spreader arms 2.4 are formed in one piece with the seat shoulder 2.1 and extend from the underside of the latter to the inner end. At the inner end there are then undercut shoulders 2.5 extending radially outwards at an acute angle from the central longitudinal axis of the undercut anchor 2, which in the present case have a substantially triangular geometry in side view, enclosing an acute angle of about 450 between the inner flank and the outer flank. The outer circumferential edge of the undercut shoulder 2.5 extends almost to the outer circumferential edge of the seat shoulder 2.1 or is slightly smaller. Longitudinal slots 2.6 are formed between the respective adjacent expansion arms 2.4 so that the expansion arms 2.4 can be deflected independently of one another in relation to the longitudinal axis 2.7 of the anchor when a screw is screwed into the through hole 2.3.

In the center of each outer circumferential surface of each undercut shoulder 2.5, an isosceles cutting notch 2.8 is introduced, here in V-shape, the apex of which extends to the exterior of the spreader arm 2.4. The corners of these cutting notches 2.8 together with the corners of the ends of the spreader arms 2.4 facing the longitudinal slots 2.6 form the cutting surfaces for cutting into the surrounding material when the undercut anchor 2 is rotated about the longitudinal anchor axis 2.7 to form the undercut at the bottom of a blind hole.

In the as-delivered condition, the expansion arms 2.4 are bent in towards the longitudinal axis 2.7 of the anchor, so that the outer flanks of the undercut heels 2.5 are approximately flush with the area where the expansion arms 2.4 are formed on the inner end of the attachment heel 2.1.

Figure 6:
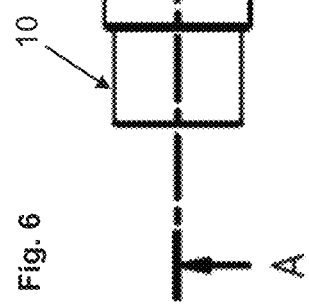
Figure 8:
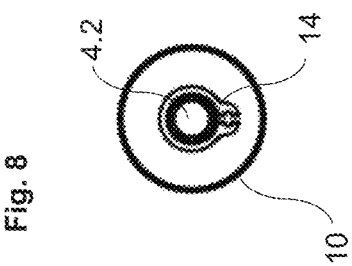

FIG. 6 shows a top view of the setting tool, essentially comprising a main shaft 4 which extends along a setting tool longitudinal axis 6 from a proximal drive end 4.1 to a distal working end 4.2. An external hollow cylindrical sleeve 8 is mounted on this main shaft 4. Furthermore, a plug-in nut 10 is rotationally fixed and longitudinally displaceable on the main shaft 4.

The main shaft has several wrench flats at the drive end 4.1, here designed as a hexagon, which can be inserted in a chuck or a bit holder in a driven chuck of a drill or a cordless screwdriver in a rotationally fixed manner. In the distal direction of the working end 4.1, a sleeve section 4.3 adjoins, on which the hollow sleeve 8, provided with a central through-opening, is seated with a shoulder, for which it has a central through-opening. Distally adjacent to this sleeve section 4.3, a radially widened sleeve stop 4.4 is formed on the main shaft 4, against which the sleeve 8 rests with the upper shoulder. The outer surface of the sleeve 8 extends from the sleeve section 4.3 to approximately the end of the main shaft shortly before the working end 4.2, which is formed as a spreading end 4.5.

The radially widened sleeve stop 4.4 is followed distally by a nut section 4.8, again with a radially reduced outer diameter, in which a key is seated in a keyway and connects the main shaft 4 non-rotatably to the socket 10.

Adjacent to this follower section 4.8 on the main shaft 4 is a cylindrical distal section 4.6 with a slightly reduced outer diameter compared with the follower section 4.8.

A compression spring 12 is inserted on the inside between the sleeve stop 4.4 and the inner lateral surface of the hollow cylindrical sleeve 8, which acts on the proximal end of the socket 10.

An outside socket shoulder 10.1 may be formed on the socket 10 at the proximal end to form a stop, which may be formed to correspond to an inside socket shoulder 8.1 on the distal inside of the sleeve 8, so that these correspondingly formed shoulders 8.1, 10.1 form a means of fixing the depth of penetration of the socket 10 into the sleeve 8 receiving it when the socket 10 is displaced axially relative to the stationary sleeve 8.

The socket 10 can be axially fixed on the distal end 4.6 of the main shaft 4 by means of a snap ring 14, which is located at the transition between the distal section 4.6 of the main shaft 4 and the spreading end 4.5 with reduced diameter. At the front end, i.e. the distal end, the socket 17 has a wrench flat 10.2 on the inside, in this case designed as a hexagon.

The sleeve 8 is fixed in the proximal direction on the main shaft 4 by means of another snap ring 16.

To realize a rotationally fixed connection between the socket 10 and the main shaft 4, the distal end 4.6 is provided with external key surfaces on which corresponding mating surfaces on the inside of the central through opening of the socket 10 are seated in a rotationally fixed but longitudinally displaceable manner.

Figure 7:
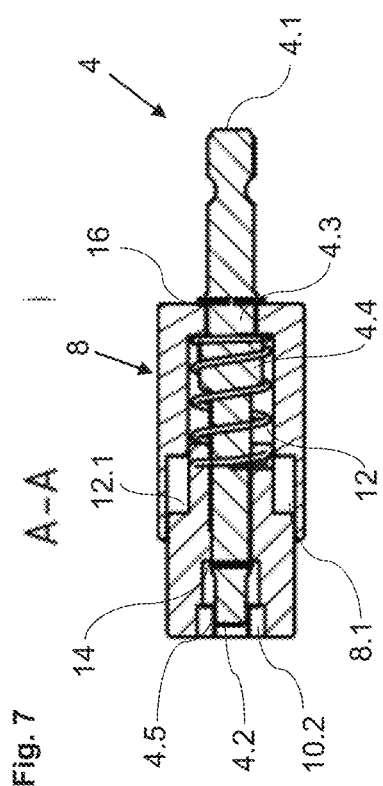
Figure 7:
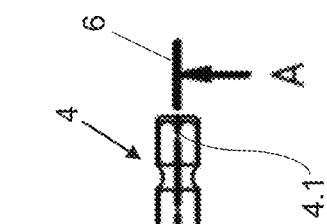

Thus, the socket 10 is displaceable between the extended position shown in FIGS. 6 and 7 and a retracted position not shown, in which the inside socket shoulder 8.1 comes into abutment with the outside and corresponding socket shoulder 10.1 and thus the compression spring 12 is also compressed. This is the case when the socket 10 is placed on the outside key surface 2.2 of the undercut anchor two and, when the main shaft 4 is rotated, pressure is simultaneously exerted on the main shaft 4 in the axial direction so that the distal expanding end 4.5 of the main shaft enters the through opening 2.3 of the undercut anchor 2 and the expanding arms 2.4 press radially outward. When the main shaft 4 is rotated further by means of the drive, the radially projecting undercut shoulders 2.5 at the inner end of the expansion arms 2.4 thus form the corresponding undercut in the material at the bottom of the blind hole.

Figure 10:
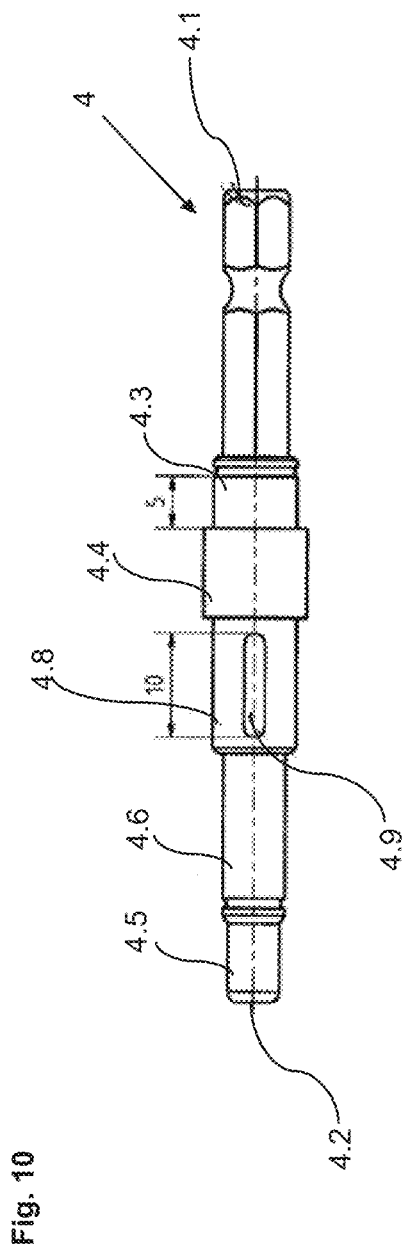

FIG. 10 shows a top view of the main shaft 4 as an individual part. It is easier to see here that the follower section 4.8 has a slightly enlarged outer diameter compared to the distal section 4.6 and a keyway 4.9 in this follower section for receiving a key for the torsionally fixed but at the same time longitudinally displaceable connection with the socket 10. Of course, other positive connections are possible, such as a square or hexagonal.

Figure 11:
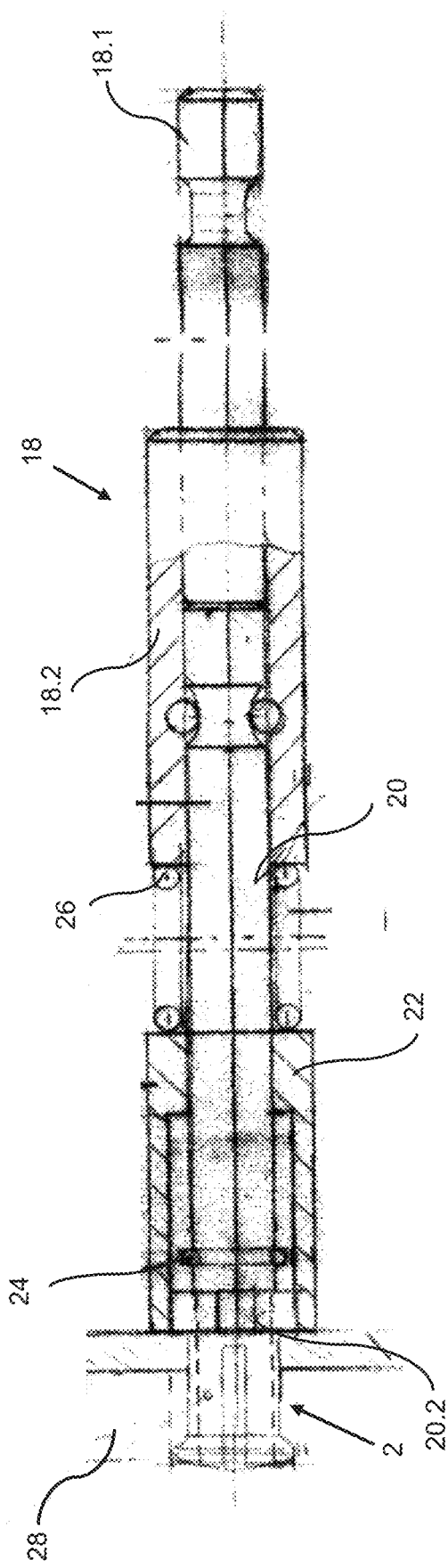

FIG. 11 then shows a longitudinal section of a second embodiment of a setting tool 17 comprising a universal bit holder 18, which can be inserted with a proximal bit receptacle 18.1 in a non-rotatable and releasable manner into a drill chuck of a cordless screwdriver or a drill. This bit holder 18 comprises an insertion sleeve 18.2 with an internal, spring-loaded ball lock, which can be released in a known manner via an axial adjustment of the insertion sleeve 18.2.

A shaft 20 with an external hexagon is inserted non-rotatably into the insertion sleeve 18.02 and can be locked non-rotatably therein by means of the ball lock.

A hollow socket 22 is attached to the distal end of the shaft 20 and secured distally by a distal snap ring 24. The socket 22 is seated on a square section 20.1 of the shaft 20 in a rotationally fixed and longitudinally displaceable manner. A compression spring 26 is arranged between the insertion sleeve 18.2 of the bit holder 18 and the socket 22. In this way, the distal working end of the socket nut 22 can be placed on the outside wrench flats of the seating shoulder 2.1 of the undercut anchor 2, which is inserted into a blind hole in a facade panel 28. By rotating the setting tool 17 and simultaneously pressing it down axially in the distal direction, the distal expanding end 20.2 of the shaft 20 is inserted into the undercut anchor 2, pushing its expanding arms 2 radially outwards so that they cut into the undercut at the bottom of the blind hole as they rotate.

FIGS. 12 to 14 show the second embodiment of the undercut anchor 30, which is basically similar in construction to the first embodiment shown in FIGS. 1-5, which is why the same reference signs after the dot are also used for this undercut anchor 30, i.e. 30.X in each case.

In contrast to the first embodiment shown in FIGS. 1 to 5, this second embodiment has a more stable, in this case higher, undercut shoulder 30.5 at the inner end of the spreader arms 30.4. This is because a knurl 30.9 is additionally formed at each of the radially outer ends or outer peripheral surfaces of the undercut shoulders 30.5 in order to improve and increase the material removal rate for forming the undercut in the blind hole. In addition to the angular cutting edges 30.8 also provided in this embodiment in the outer circumferential surfaces of the undercut shoulders 30.5, which are also formed as circular arc segments, the height h of the undercut shoulders 30.5 is formed to be about two to four times as high as in the first embodiment. The outer circumferential surface of the undercut shoulders 30.5 preferably has the height h between 0.2 to 1 mm, preferably 0.5 mm. The height h of the outer circumferential surface of the undercut shoulders 30.5 is to be understood as the distance between the inner end or inner flank 30.10 of the spreader arms 30.4 extending transversely to the central longitudinal axis and the outer flank 30.11 of the undercut shoulder 30.5, which encloses an angle of about 45 degrees with the central longitudinal axis or longitudinal anchor axis 30.7.

The sequence of figures in FIG. 15 shows an enlarged view of the setting process according to the invention in four substeps A-D, each at the end of a substep.

In step A, a blind hole was first made in the joining partner 32 by means of drilling, preferably to such a depth that the bore of the blind hole is slightly deeper than the length of the undercut anchor 30, i.e. the undercut anchor 30 does not quite reach the bottom of the blind hole with its expansion arms.

In step B, the undercut anchor 30 was inserted into this blind hole with the expansion arms 30.4 compressed.

The setting tool 4 is then placed on the external wrench flats 30.2 on the seating shoulder 30.1 of the undercut anchor 30. By rotating the setting tool 4 and pressing in, i.e. axially adjusting, the expansion end 4.5 between the expansion arms 30.4 of the undercut anchor 30, the undercut shoulders 30.5 are then inserted into the joining partner 32, precisely adapted to the respective undercut anchor 30, which offers the latter a particularly firm hold due to the form-fit connection.

After removing the setting tool at the end of step D, the undercut anchor 30 is completely spread and set, i.e. held captive in the mating partner.

FIG. 16 shows a top view of a further embodiment of a setting tool, again essentially comprising a main shaft 36 extending along a setting tool longitudinal axis 37 from a proximal drive end 36.1 to a distal working end 36.2. An external hollow cylindrical sleeve 38 is mounted on this main shaft 36. In the sleeve 38, a socket 40 is again received in a longitudinally displaceable manner, which is further connected to the main shaft 36 in a rotationally fixed manner via a screw, in this case primarily a grub screw 42, which is screwed into the socket 40 laterally on the outside.

At the drive end 36.1, the main shaft 36 has a plurality of wrench flats in the form of a hexagon, which can be inserted in a chuck or bit holder in a driven chuck of a drill or cordless screwdriver in a rotationally fixed manner. Distally adjoining the active end 36.1 is a sleeve section 36.3, on which the hollow sleeve 38, provided with a central through-opening, is seated with a shoulder, for which purpose the sleeve has a central through-opening. Distally adjacent to this sleeve section 36.3, a radially widened sleeve stop 36.4 is formed on the main shaft 36, against which the sleeve 38 rests with the upper shoulder.

The radially widened sleeve stop 36.4 is followed distally, again with a radially reduced outer diameter, by a nut section 36.8 in which an elongated keyway 36.9 is formed on one side.

Adjacent to the follower section 36.8 on the main shaft 36 is a cylindrical distal section 36.6 with a slightly reduced outer diameter compared to the follower section 36.8. The distal end of this distal section 36.6 forms the active end 36.2 of the main shaft 36.

The sleeve 38 preferably extends from the sleeve section 36.3 to beyond the end of the nut section 36.8.

The distal fixation of the socket 40 can be done via a snap ring on the distal end of the main shaft 36, which is not shown. At the front end, i.e. the distal end, the socket 17 has a wrench flat 40.2 on the inside, in this case designed as a hexagon.

The sleeve 8 is fixed in the proximal direction on the main shaft 36 by means of another snap ring 16.

On the inside, between the sleeve 38 and the socket 40, a compression spring 42 is accommodated under pretension, which presses the socket 40 out of the sleeve 38. A cheese-head screw 44 screwed into the side of the socket 40 engages in the slot 36.9 and thus simultaneously limits the front and rear stop position of the socket 40 in relation to the sleeve 38, which receives it in a longitudinally displaceable manner.

To realize a rotationally fixed connection between the socket 10 and the main shaft 4, the distal end 4.6 is provided with external key surfaces on which corresponding mating surfaces on the inside of the central through opening of the socket 10 are seated in a rotationally fixed but longitudinally displaceable manner.

Thus, the socket 10 is displaceable between the extended position shown in FIGS. 6 and 7 and a retracted position not shown, in which the inside socket shoulder 8.1 comes into abutment with the outside and corresponding socket shoulder 10.1 and thus the compression spring 12 is also compressed. This is the case when the socket 10 is placed on the outside key surface 2.2 of the undercut anchor two and, when the main shaft 4 is rotated, pressure is simultaneously exerted on the main shaft 4 in the axial direction so that the distal expanding end 4.5 of the main shaft enters the through opening 2.3 of the undercut anchor 2 and the expanding arms 2.4 press radially outward. When the main shaft 4 is rotated further by means of the drive, the radially projecting undercut shoulders 2.5 at the inner end of the expansion arms 2.4 thus form the corresponding undercut in the material at the bottom of the blind hole.

FIG. 20 shows an enlarged top view of the main shaft 36 as an individual part. It is easier to see here that the follower section 36.8 has a slightly enlarged outer diameter compared to the distal section 36.6 and has the elongated groove 36.9 in this follower section for rotationally fixed but relatively movable reception of the cylinder head screw 44.

In summary, the invention relates to an undercut anchor formed to facilitate the formation of a corresponding undercut in a blind hole for receiving the undercut anchor in order to independently cut or form this undercut by rotating and spreading the undercut anchor.

To this end, a setting tool for forming this undercut at the bottom of the blind hole in the joining partner is further disclosed.

Finally, a method of forming an undercut on a blind bottom of a material hole in a joining partner using a setting tool is disclosed.

LIST OF REFERENCE SIGNS 2 undercut anchor
2.1 Ride-on seat
2.2 Wrench flat
2.3 Through hole
2.4 Spreading arm
2.5 Undercut heel
2.6 Longitudinal section
2.7 Anchor longitudinal axis
2.8 Cutting notch
4 Main shaft
4.1 Drive end
4.2 Effective
4.3 Sleeve section
4.4 Sleeve stop
4.5 Spreading
4.6 Distal section
4.8 Nut section
4.9 Fit spring groove
6 Longitudinal axis of setting tool
8 Sleeve
8.1 Sleeve heel
10 Socket
10.1 Socket heel
10.2 Wrench flat
12 Pressure spring
12.1 Nut heel
14, 16 Spring ring
17 Setting tool
18 Bit holder
18.1 Bit recording
18.2 Insertion sleeve
20 Wave
20.1 Square section
20.2 Spreading
22 Plug nut
24 Spring ring
26 Pressure spring
28 Facade panel
30 Intersection anchor
30.1 Fit heel
30.2 Wrench flat
30.3 Through hole
30.4 Spreading arm
30.5 Undercut heel
30.6 Longitudinal section
30.7 Anchor longitudinal axis
30.8 Cutting notch
30.9 Knurling
30.10 Inner flank
30.11 Outer flank
32 joining partner
34 Sac hole
36 Main shaft
36.1 Drive end
36.2 working end
36.3 Sleeve section
36.4 Sleeve stop
36.6 Distal section
36.8 Nut section
36.9 Long groove
36.5 Spreading
37 Longitudinal axis of setting tool
38 Sleeve
40 Socket
40.2 Dish area
42 Pressure spring
44 Cylinder head screw
46 Spring ring

The invention claimed is:

1. A setting or fastening method for fastening an undercut anchor (2; 30) with
a substantially hollow cylindrical body extending along and around a longitudinal anchor axis (2.7; 30.7), which extends from an outer end arranged in the installation position to an inner end,
the outer end having a radially outwardly projecting, seating shoulder (2.1; 30.1), which has a through opening (2.3; 30.3) extending along the longitudinal axis of the anchor and having an internal thread, which is designed to be placed around a blind hole on an outer surface of a joining partner, and
wrench flats (2.2; 30.2) on an outer circumferential surface for rotationally fixed connection to a tool, in particular a setting tool (17), and
wherein a plurality of arm-shaped and spreadable spreading arms (2.4; 30.4) extending parallel offset to the longitudinal axis of the anchor are formed by the seating shoulder (2.1; 30.1),
wherein an undercut shoulder (2.5; 30.5) projecting radially outwardly is formed at the inner end of each of the spreader arms (2.4; 30.4), in a joining partner, in particular a concrete or composite slab, the method comprising:

drilling a blind hole in the joining partner, which extends from a blind hole upper end at an outer surface of the joining partner to a blind hole lower end in the joining partner; and forming an undercut in the joining partner at the bottom of the blind hole, and wherein the undercut is formed only by rotating and spreading the undercut anchor (2; 30).

2. The fastening method according to claim 1, wherein the turning and spreading is carried out with a setting tool (17) with a main shaft (4; 36) extending about an axis of rotation from a proximal end to a distal end which extends from a proximal end formed as a drive end (4.1; 36.1) along a setting tool longitudinal axis (6; 37) to a distal working end (4.2; 36.2), wherein the drive end (4.1; 36.1) is designed for rotationally fixed connection to a rotary drive, wherein a socket (10; 22) with a receiving opening and wrench flats formed therein is formed at the working end for rotationally fixed reception of a seating shoulder of an undercut anchor (2; 30), wherein the socket (10; 22) is connected or connectable to the main shaft (4) in a rotationally fixed manner, wherein the socket (10; 22) is arranged longitudinally displaceably on the main shaft (4), wherein the main shaft (4) comprises a spreading end (4.5; 20.2) at the distal end, and wherein a compression spring (12; 26) acts on a proximal end of the socket (20; 22).

* * * * *